Nov. 6, 1945.  E. V. SCHAAL  2,388,500
WINDSHIELD CLEANER
Filed Jan. 24, 1940  2 Sheets-Sheet 1

INVENTOR
EARL V. SCHAAL,
BY
Beau, Brooks, Buckley & Beau.
ATTORNEYS

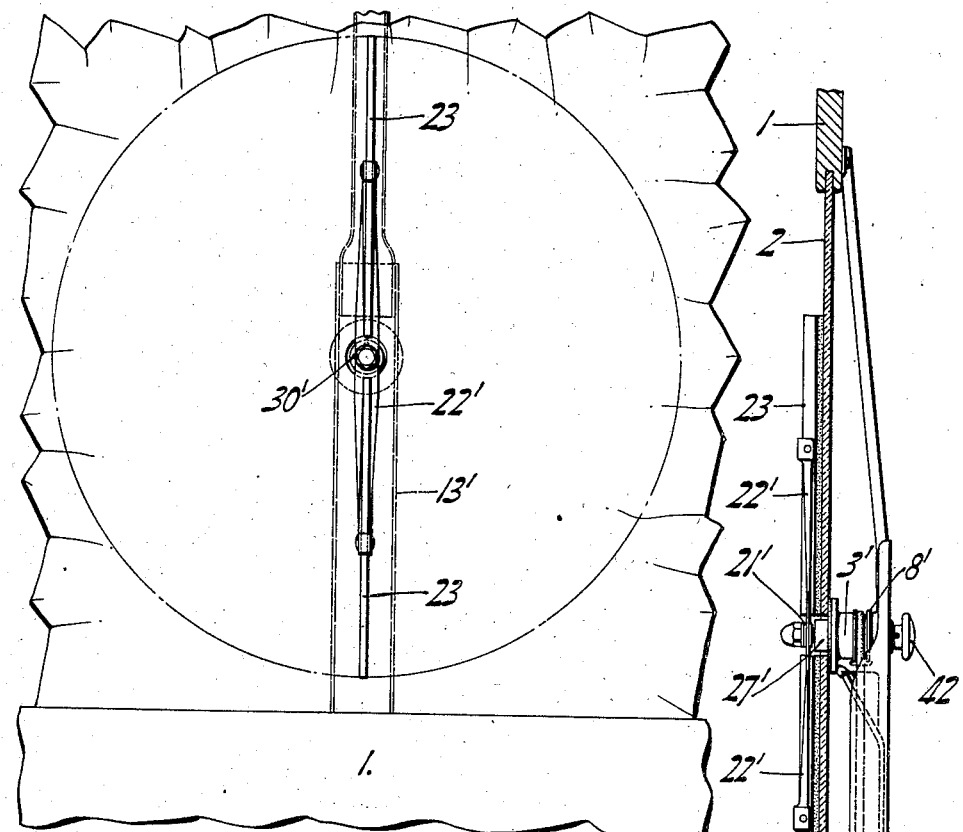
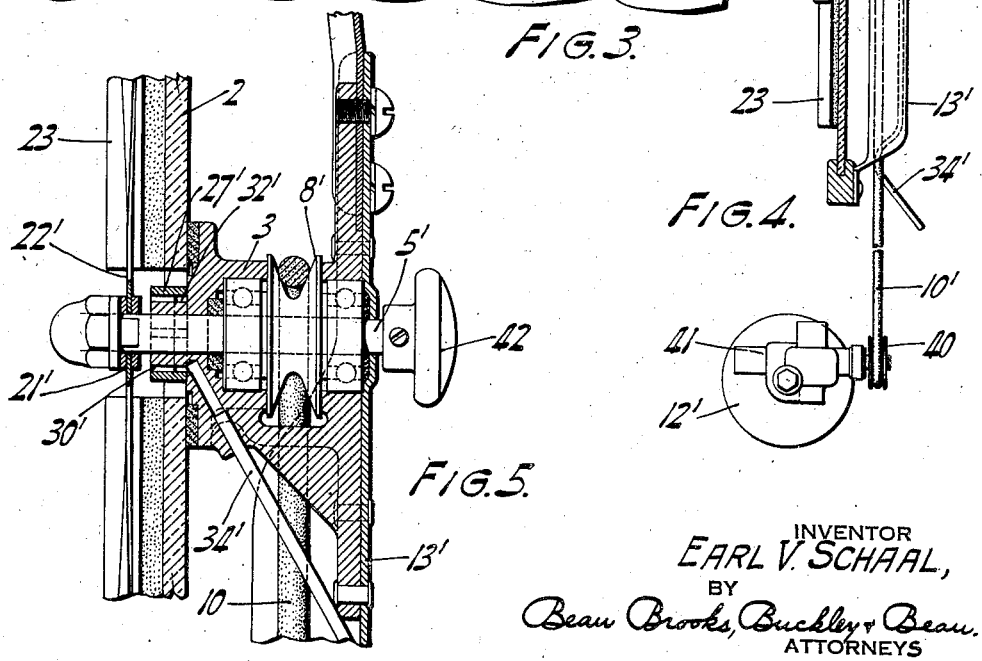

Patented Nov. 6, 1945

2,388,500

UNITED STATES PATENT OFFICE 2,388,500

WINDSHIELD CLEANER

Earl V. Schaal, East Aurora, N. Y., assignor to Trico Products Corporation, Buffalo, N. Y.

Application January 24, 1940, Serial No. 315,396

2 Claims. (Cl. 15—250.4)

This invention relates to a windshield cleaner and is especially designed for the cleaning of windshields and windows of motor cars, airplanes, and other fast moving vehicles, the vision through which may readily and quickly become obscured with the deposit of ice and other vision obscuring matter incidental to the excessive speeds at which the vehicle travels or by reason of extreme temperatures encountered in the lanes of travel.

The primary object of the invention is to provide a windshield cleaner which is efficient in operation and effective in maintaining the field of vision through the windshield free of vision obscuring matter. A further object is to provide a cleaning mechanism in which a solvent is delivered in a novel manner to the exterior surface of the windshield and in the path of a wiper which is moving at a high speed and in a single direction for coacting therewith in loosening and removing such vision obscuring matter from the field of vision.

In the accompanying drawings, wherein the inventive principles and teachings of the present invention have been incorporated in two physical embodiments, Fig. 1 is a fragmentary front elevation showing on embodiment of a windshield cleaner constructed in accordance with the present invention;

Fig. 3 is a front elevation of the other embodiment;

Fig. 4 is a side elevation thereof; and

Fig. 5 is an enlarged sectional view through the wiper shaft mounting.

Figure 1:
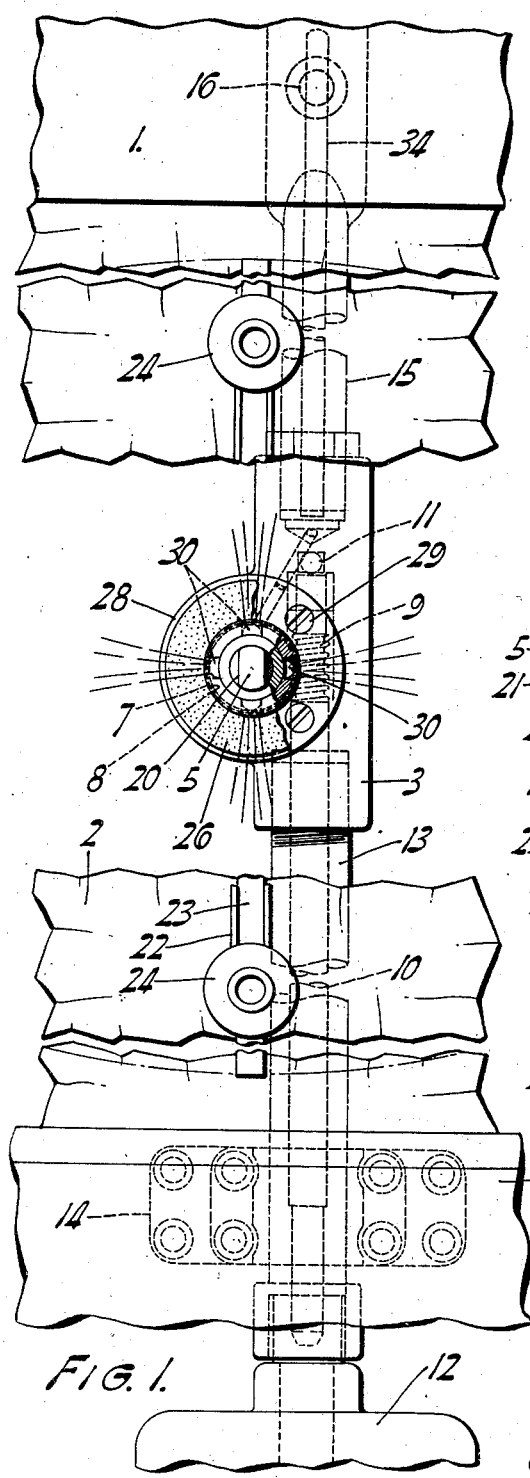
Figure 2:
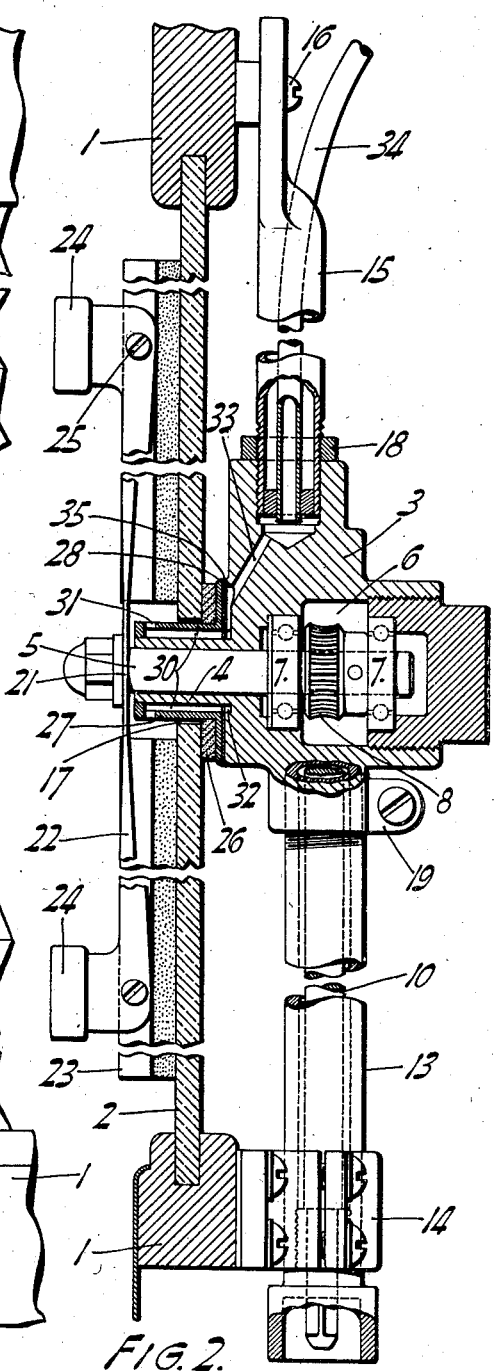
Fig. 2 is a similar view in side elevation with portions being depicted in section.

Referring more particularly to the accompanying drawings, the numeral 1 designates the windshield framing structure and 2 the glass thereof.

Preferably at the inner side of the windshield is a housing 3 having a sleeve 4 through which a wiper operating shaft 5 extends from a chamber 6. Suitable ball bearing supports 7 arranged within the body or housing 3 provide anti-friction support for the shaft, and keyed on the latter within the chamber is a worm wheel which meshes with a worm 9 fixed to the upper end of a drive shaft 10. The upper end of the shaft 10 may have suitable thrust bearing support against a ball bearing 11, while the lower end is detachably clutched to an electric motor 12 or other suitable source of power by which the wiper shaft 5 may be rotated at the desired high speed. The shaft 10 may be housed within a tubular support 13 which is suitably braced from the framing structure 1, as by a clamp 14, and cooperates with another tubular member 15 attached to the opposite side of the framing structure at 16 to provide a multi-armed bracket support for the transmission housing 3, each arm of which has threaded engagement with the housing. These diametrically arranged bracket arms 13, 15, give substantial support for the housing where the bearing sleeve 4 extends through an opening 17 in the windshield glass 2. The threaded engagement of the bracket arms may be locked firmly by means of a jam nut 18 in one instance and a split spring clamp 19 in the other.

The forwardly protruding end of the wiper shaft 5 may have flat keying faces 20 to be conformably received in a like shaped opening of a hub 21 from which radiates a plurality of arms 22 carrying wipers or scrubbers 23. The arms are shown as being resilient in character and adapted to be sprung inwardly toward the glass under the centrifugal action of the outwardly carried weights 24, so as to urge the wipers into firm wiping contact with the glass. The wipers are pivotally connected to the arms by pivot pins 25 to thereby insure proper engagement with the glazed surface. A cushioning washer 26 of rubber or other suitable material may be interposed between the inner face of the glass and the housing 3 to render the installation weater-proof as well as to afford protection for the glass.

For supplying the outer surface of the glass with a suitable solvent, which for removing ice would be an anti-freeze solution, a nozzle in the form of a sleeve 27 is mounted about the shaft supporting sleeve 4 by means of a base flange 28 secured to the adjacent face of the housing by fasteners 29. This sleeve is formed on its inner surface with longitudinal grooves 30 closed at their inner sides by the sleeve 4 and terminating at their outer ends in an annular series of orifices or radial ports 31 for discharging the solvent toward the wipers beneath the arms 22. An annular groove 32 in the housing 3 connects the inner ends of the grooves 30 with a supply duct 33 to which the anti-freeze solution is supplied by a conduit 34 from a reservoir (not shown) from which the solvent may feed by gravity. A suitable gasket 35 is arranged beneath the mounting flange 28 to properly confine the solvent to its path of flow from the duct 33 into the annular groove 32 and out through the longitudinal passages 30 for final discharge from the ports 31. This arrangement simplifies the manner of forming the passages and renders them accessible for cleaning.

If desired, the anti-freeze solution may be discharged forwardly in an axial direction as shown in the modified embodiment of Figs. 3, 4 and 5, wherein the solvent supply pipe 34' extends upwardly through the lower bracket arm 13' and communicates with an annular groove 32' in the back face of the nozzle 27'. The duct-forming grooves 30' lead from the annular groove and discharge through alined orifices or ports in a direction parallel to the axis of rotation, the issuing jets of solvent being intercepted at intervals by the rapidly rotating wiper arms 22' or hub 21' for being splashed or deflected back onto the glass while any small increments from the jets which pass through the path of the arms will be carried by the wind back against the glass. The solvent may be supplied to the pipe 34' from a supply (not shown) under a pressure sufficient to produce a discharging spray or it may escape slowly through the discharge orifice in drops, passing from the orifices onto the glass under the impetus given by the air pressure in front of the glass while traveling, for being effectively spread by the wipers. The rapidly rotating wipers being firmly pressed against the windshield by the centrifugal action of the weights 24, will cause the solvent to move or flow outwardly under centrifugal force to cover the entire area swept by the wipers in their circular path of movement thereby coacting to scrub the surface of any vision obscuring matter.

In the modified embodiment a belt drive is utilized, the wiper shaft 5' being journaled in a modified housing 3' designed to permit the belt 10' passing up over the pulley 8' from a drive pulley 40 which is driven from the motor 12'.

In either embodiment the wipers are rotated across the field of vision at a speed sufficiently high to prevent them becoming an annoyance to the operator of the vehicle. At such a speed the wipers are practically invisible and consequently without interference with the vision through the glass to any practical extent. A speed of operation of approximately 600 R. P. M. has been found desirable to operate the wipers in a manner to render them practically unnoticeable. A hand knob 42 may be fixed on the inner end of the wiper shaft. The solvent is supplied to the inner circumference of the path of the wipers and will become rapidly spread by the wipers in an outward direction so as to maintain the field of vision practically free from vision obscuring matter.

The discharge ports in both forms of the invention are arranged near the axis of rotation of the wipers or wiper blades so that the liquid is fed into the path of the blades and to the leading surfaces of the blades near the inner ends thereof for being distributed by centrifugal force over the glass surface.

While the foregoing description has been given in detail, it is obvious that the inventive principles herein involved may assume other physical embodiments without departing from the spirit or scope of the invention set forth in the appended claims.

What is claimed is:

1. A windshield cleaner comprising a housing with means for supporting the housing adjacent the inner surface of the windshield glass, said housing having a sleeve extending through an opening in the glass, a shaft journaled in the housing with one end protruding from the sleeve, wiper means fixed to the protruding end of the shaft for operation thereby over the outer surface of the glass, means for operating the shaft, a spray nozzle in the form of a sleeve encircling the housing sleeve and fixed to the housing, said nozzle having an annular series of orifices discharging radially between the point of connection of said wiper means with the shaft and the windshield glass, and means for supplying the nozzle with a solvent.

2. A windshield cleaner comprising a housing with means for supporting the housing adjacent the inner surface of the windshield glass, said housing having a sleeve extending through an opening in the glass, a shaft journaled in the housing with one end protruding from the sleeve, wiper means fixed to the protruding end of the shaft for operation thereby over the outer surface of the glass, means for operating the shaft, a spray nozzle in the form of a sleeve encircling the housing sleeve and fixed to the housing, said nozzle having an annular series of grooves closed at one side by the housing sleeve and discharging at the outer surface of the glass in an annular series of orifices, and means for supplying the nozzle with a solvent.

EARL V. SCHAAL.